Aug. 30, 1966  A. P. HARDISON  3,269,694
GATE VALVE HAVING BIASED SEALING MEANS
Filed May 13, 1963  2 Sheets-Sheet 1
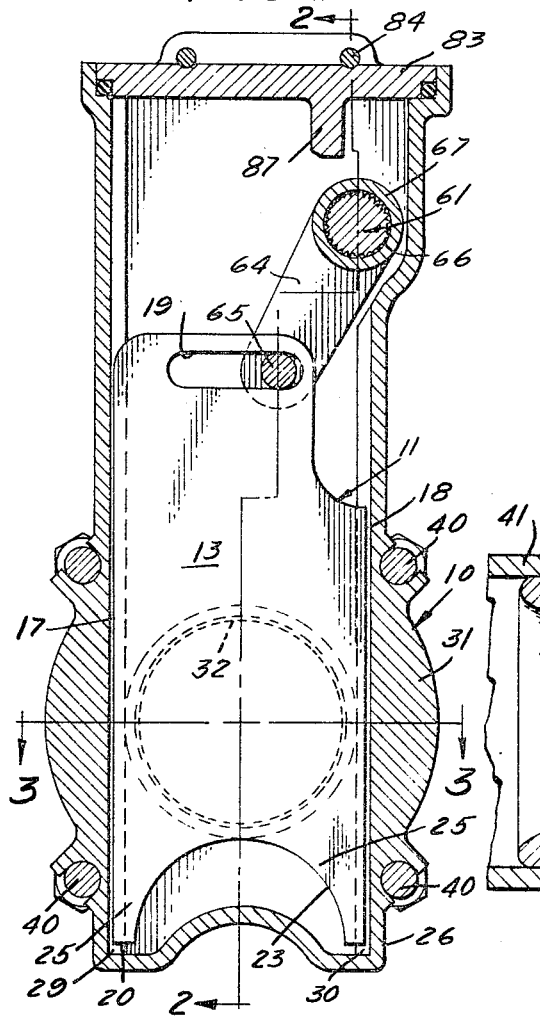
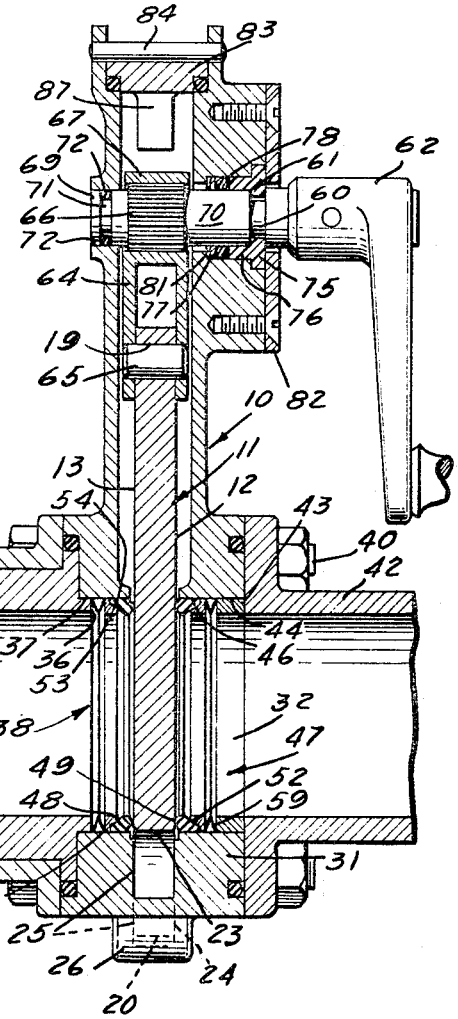
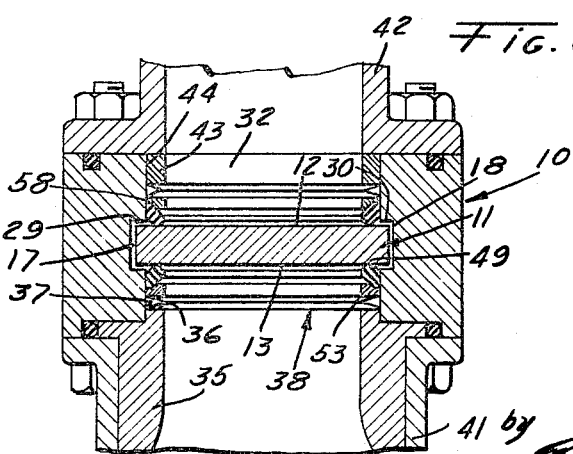
Artson P. Hardison,
INVENTOR.
WHANN & McMANIGAL
Attorneys for Applicant

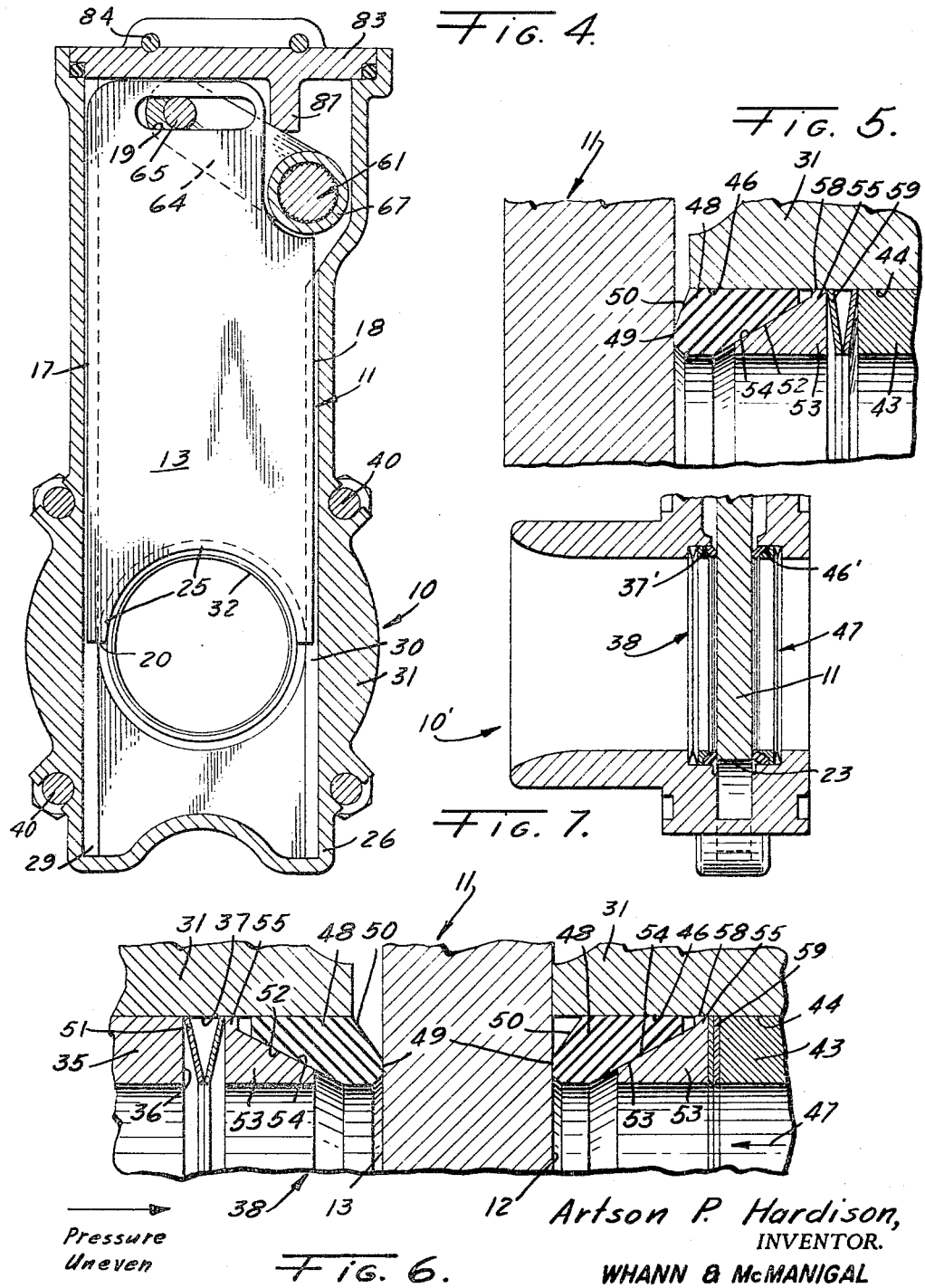

United States Patent Office 3,269,694
Patented August 30, 1966

3,269,694
GATE VALVE HAVING BIASED SEALING MEANS
Artson P. Hardison, Glendora, Calif., assignor to Schulz Tool and Manufacturing Co., San Gabriel, Calif., a corporation of California
Filed May 13, 1963, Ser. No. 279,792
12 Claims. (Cl. 251—174)

This invention relates to gate valves and, more particularly, to a gate valve having spring biased and pressure actuated seals.

To obtain an effective seal in a gate valve flow passage, where the seals are subject to wear or subject to extremes in temperatures so as to cause them to expand and contract, it has been found that it is desirable to have the seals slidable in the inlet and outlet so that they can be spring biased and pressure actuated into sealing contact with the gate. The spring biased seals in gate valves present the problem of tending to move into the path of the gate when the valve is open and are thus likely to be damaged when the valve is closed.

Accordingly, it is an object of this invention to provide an improved gate valve.

It is another object of this invention to provide a gate valve having improved seals.

It is still another object of this invention to provide a gate valve having spring biased, floating, or pressure actuated seals, in which any of the foregoing types of seals or a combination thereof are prevented from moving into the path of the gate when it is opened.

It is a further object of the present invention to provide a shaft and lever operated type of gate valve in which the shaft seal structure is pressure balanced so that regardless of internal pressure, the shaft will not tend to bind as it is rotated to open and close the valve.

It is a still further object of the invention to provide a gate valve having seals which can be acted upon to relieve excessive pressure built up within the valve body when the excessive pressure is greater than the line pressure.

It is another object of the invention to provide a gate valve having seals as described in preceding paragraphs and to which access may be had for their removal and replacement without disassembling the valve, and whether or not the valve is open or closed.

Further objects and advantages of the invention may be brought out in the following part of the specification wherein small details have been described for the competence of disclosure, without intending to limit the scope of the invention which is set forth in the appended claims.

Referring to the accompanying drawings, which are for illustrative purposes only:

FIG. 1 is a side elevational, partially cross sectional view of a gate valve, according to the invention, with the valve in its closed position;

FIG. 2 is a side elevational, cross sectional view, taken substantially as indicated by the line 2—2 in FIG. 1;

FIG. 3 is a cross sectional plan view, taken as indicated by the line 3—3 in FIG. 1;

FIG. 4 is a view of the valve as shown in FIG. 1, but in the open position;

FIG. 5 is an enlarged, fragmentary, cross sectional view illustrating the sealing structure;

FIG. 6 is an enlarged, fragmentary, cross sectional view of the gate and seal means, illustrating the effect on the seal means and on the gate of the pressure on one side of the gate being greater than that on the other; and FIG. 7 is a fragmentary side elevational, cross sectional view of another embodiment of a valve housing.

Referring again to the drawings, there is shown in FIGS. 1-4 a gate valve, comprised of a one-piece housing or body 10 having slidably engaged therein an elongated gate 11. The gate has two opposite, parallel flat sides 12 and 13, spaced by two end edges 17 and 18. At its upper end is a horizontal slot 19 extending through the gate from one of the opposite sides to the other, and at its lower end 20, extending inwardly therefrom, is a semicircular recess or cut-away portion 23, having its center at the intersection of the longitudinal center line of the gate and a line extending across the surface of the lower end 20 between the two end edges 17 and 18. Surrounding the recess 23, and forming part of the opposite side faces 12 and 13, are seal engaging surfaces 24 and 25, respectively.

At the lower end of the housing, there is an extension 26 to receive the lower end of the gate 20 when the gate is in its closed position. Extending upwardly, on opposite portions of the housing, are vertical tracks 29 and 30 in which the gate is slidably engaged to move vertically to its open and closed positions.

Immediately upwardly of the extension 26 is an enlarged portion 31 of the housing through which extends flow passage 32. The portion 31 is enlarged to effect seals with pipe flanges. The inlet or outlet may be at either end of passage 32, but for ease of description, the inlet is called for here as being formed by a flanged cylindrical sleeve 35 sealingly secured to the housing. At its inner end is an annular shoulder 36 which, with an inner cylindrical surface 27 of the portion 31 and the gate surface 13 or 25, forms a grooves or recess to receive the inlet sealing structure, generally designated as 38.

Outwardly of the sleeve 35 is a flanged piping fitting 41 having its flange in sealed abutment with one outer lateral surface of the body portion 31. On the outlet side of the valve is a flanged piping fitting 42 having its flange in abutment with the other outer lateral surface of the portion 31. The pipe fittings 41 and 42 are secured to the portion 31 by means of bolts 40. Immediately inwardly of the piping 42 and being held in place thereby is a ring 43, slidably engaged on inner cylindrical surface 44. Axially inwardly of the ring 43 is a recess or groove 46 having therein the outlet sealing means, generally designated as 47.

The sealing means 38 and 47 are of the same structure but are in allochiral relationship. They are formed, as may be best seen in FIGS. 5 and 6, of elastomeric sealing rings 48 having inner lateral faces 49 in sealing abutment with the opposite faces 12 and 13 of the gate. Radially outwardly of the faces 49 are axially diverging faces 50. Each of the seal rings has a beveled face 52, tapering radially outwardly from the inner diameter and increasing in diameter axially outwardly of the gate. Axially outwardly of the seals 48 are seal metal back-up rings 53, having a tapered surface 54 of the same angle as surface 52 and in abutment therewith. Extending radially outwardly from the tapered surface 54 is a flange 55 having an outer circumferential surface 58, slidably engaged with the respective cylindrical surfaces 37 and 46.

Axially outwardly of each of the back-up rings 53 are two abutting spring washers 59, slidably engaged, respectively, in the cylindrical surfaces 37 and 46. The axially outward washer 59 on the inlet side is in abutment with the shoulder 36 of the sleeve 35 and the corresponding washer 59 on the outlet is in abutment with the inner lateral surface of the ring 43. The inner washers 59 are in abutment with the flanges 55 of the back-up rings 53.

When there is no pressure on the seals or if the pressure on both sides of the closed gate is the same, the gate, the seals 48, and the washers 59 are in the positions as shown in FIG. 5. With the gate closed, as shown in FIG.

6, with a greater pressure on the left side of the drawing, the respective elements take the positions shown with the side 12 of the gate being moved against the portion 31 on the right and against the sealing face 49, the spring washers being bottomed out or substantially flattened. Here, the elastomeric seal 48 on the right is somewhat compressed to form a seal on the gate and it is forced radially outwardly by the mating of the tapered surfaces 52 and 54 to form a seal along the surface 44 in the recess 46.

Similarly, on the high pressure side, as indicated on the left in FIG. 6, the spring washers exert a force to hold the sealing surface 49 against the side 13 of the gate and, in addition, the pressure on the outer lateral face of the back-up ring causes an additional pressure to be exerted on the seal 48, both axially and radially, the latter being as the result of mating tapered surfaces 52 and 54. Thus, again, there is a pressure seal formed along the surface 49 of the seal and the gate surface, and at the cylindrical surface 37, radially outwardly of the seal along its outer circumferential surface.

If the gate should be closed with pressure remaining sealed within the body, irrespective of whether pressure remains in the line on either side of the gate, there is the possibility due to heating, for example, that an excessive pressure would be built up within the body. To relieve this pressure, the seals 48 are provided with the surfaces 50 radially outwardly of the sealing surfaces 49. Thus, any pressure entrained within the valve body 10 radially outwardly of the sealing surfaces 49 can act on the area provided by at least one of the annular surfaces 50 between a corresponding seal surface 49 and its bore surface 37. The force on the surface 50 overcomes the force of the springs 59 to relieve the entrained body pressure through the line. This prevents excessive pressure from building up in the body to a destructive level.

As the seals 48 on both sides of the gate are biased inwardly toward the path of the gate, when the gate is opened so as to permit flow through the passage 32, there must be a means to prevent the seals from moving axially inwardly past the gate surface and into its path. This means is provided by the recess 23 in the lower end of the gate and the seal engaging surfaces 24 and 25 formed as part of the opposite sides 12 and 13, respectively. As shown in FIG. 4, by having the gate when it is raised to its open position so that the center of the semicircular recess 23 is substantially at the center of the flow passage, the surfaces 24 and 25 maintain contact with the surfaces 49 of the seals after the closing portions of the surfaces 12 and 13 pass above the flow passage. Thus, when the gate 11 is in its open position, the seals are restrained axially outwardly so that they cannot be forced inwardly by the spring washers 59 beyond the outer surfaces 24 and 25 of the gate. The result of this is that when the gate is moved downwardly so as to be closed, there is no damage to the sealing surfaces 49, and there is a minimum of wear thereon as the seals 48 are resilient and are slidably engaged along with the metal back-up rings 53 and the spring washers 59 in the respective cylindrical surfaces 37 and 44 on opposite sides of the gate.

It is readily seen in the particular arrangement of the sleeve 35 and the ring 43, both of which are slidably removable from the housing portion 31, that when the bolts 40 have been removed so as to permit easy access to the seal structures 38 and 47, a worn part thereof may be removed and replaced without disassembling the valve.

As may be seen in FIGS. 1, 2 and 4, the gate 11 is raised and lowered in the housing end to open and close it by means of a rotatable handle 62. The handle is fixed to rotate extension 60 of an actuating shaft 61, engaged to rotate a U-shaped lever 64 having a pin 65 extending through a horizontal slot 19 of the gate and into the two legs of the lever which extend on respective opposite sides of the gate. The shaft 61 has a serrated central portion 66 which is fitted into mating internal serrations in a sleeve 67, fixedly secured to the lever so that rotation of the handle and shaft rotates the lever from the position shown in FIG. 1 to that shown in FIG. 4 and vice versa.

The shaft has two end portions 69 and 70 of equal diameters, the former having a groove 71 to receive an O-ring 72. The shaft portion 69 is rotatably engaged in a cylindrical opening through the left wall of the body. The other end portion 70 of the shaft is rotatably engaged in a split, flanged elastomeric sleeve 75 which is fitted into a counterbore 76, having also therein, inwardly of the sleeve, two spacers 77 and an O-ring 78, the latter providing the shaft seal.

Laterally inwardly of the counterbore 76 is bore 81 of adequate diameter so that the serrated portion 66 of the shaft may be passed therethrough and thereby inserted into the internally serrated sleeve 67. It is after the shaft is inserted into the sleeve 67 that the spacers 77, the O-ring 78, and the split sleeve 75 are inserted. A plate 82 secures the shaft and the seal 78 in place and a top plate 83 closes the top end of the body, the latter plate being held in pressed fit by pins 84. Extending downwardly from the plate 83 is a lever stop 87.

The shaft 61 is pressure balanced, to prevent any binding, by having the seal 72 on the end portion 69 with its outside diameter equal to the inside diameter of the seal 78 on the end of the portion 70 of the shaft. That is, no axial pressure load on the shaft is carried outside of the valve housing. Thus, the valve and shaft are always pressure balanced when the valve is open and the shaft is always pressure balanced when the valve is closed even though the valve itself is not balanced.

In FIG. 7, there is known another embodiment of the invention in which the sealing structures 38 and 47 are internally installable and in which the lower part of the valve housing 10' is made integral with the remainder of the housing to reduce the external leakage paths to a minimum. That is, as far as the seals and the gate are concerned, the structure is identical with that shown in FIG. 2, but the body is all in one piece, with the exception of the top plate 83. The spaces for the sealing structures 38 and 47 are in the form of enlarged diameter recesses 37' and 46', respectively. In this embodiment, the seals may be inserted or replaced by removing the valve from the body. The arrangement of the piping connections 41 and 42, as shown in FIG. 2, can be identical.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned, except as defined in the accompanying claims, wherein various portions have been separated for clarity of reading and not for emphasis.

I claim:
1. A gate valve comprising:
   (a) an elongated body;
   (b) a flow passage extending transversely through said body adjacent one end thereof,
   (c) said flow passage having an inlet and an outlet;
   (d) an elongated gate having substantially parallel opposite flat sides and being slidably engaged to move longitudinally in a path in said body;
   (e) a portion of said opposite flat sides adjacent one end of said gate being adapted to be moved from an open position into a closing position across said passage between said inlet and outlet to shut off the flow therethrough;
   (f) a semicircular recess extending inwardly in said one end of said gate and having its center line in a direction perpendicular to said opposite sides,

(g) said semicircular recess being in alignment with said flow passage when said gate is open;

(h) surfaces of said opposite sides extending around said semicircular recess;

(i) a rotatable shaft extending into said body;

(j) a lever connected to said shaft and to said gate to move said gate to its open and closed positions when said shaft is rotated;

(k) seal means in respective annular recesses in said inlet and outlet on each side of said gate forming a seal on the gate at the flow passage when the gate is closed;

(l) each of said seal means comprising a flexible sealing ring adapted to abut one of the respective opposite sides when the gate is closed;

(m) a back-up ring axially outwardly of each sealing ring;

(n) spring means axially outwardly of each back-up ring to bias said back-up rings into abutment with said sealing rings and said sealing rings into abutment with said respective opposite sides to form said seal; and (o) means on said back-up rings to urge said sealing rings radially outwardly in said annular recesses when said last rings are biased into abutment with said gate, (p) said sealing rings being in abutment with said surfaces of said opposite sides around said semicircular recess when said valve is open.

2. A gate valve comprising:

(a) an elongated body;

(b) a flow passage extending transversely through said body adjacent one end thereof, (c) said flow passage having an inlet and an outlet;

(d) an elongated gate having substantially parallel opposite flat sides and being slidably engaged to move longitudinally in a path in said body;

(e) a portion of said opposite flat sides adjacent one end of said gate being adapted to be moved from an open position into a closing position across said passage between said inlet and outlet to shut off the flow therethrough;

(f) a semicircular recess extending inwardly in said one end of said gate and having its center line in a direction perpendicular to said opposite sides, (g) said semicircular recess being in alignment with said flow passage when said gate is open;

(h) surfaces of said opposite sides extending around said semicircular recess;

(i) a rotatable shaft extending into said body;

(j) a lever connected to said shaft and to said gate to move said gate to its open and closed positions when said shaft is rotated;

(k) seal means in respective annular recesses in said inlet and outlet on each side of said gate forming a seal on the gate at the flow passage when the gate is closed;

(l) each of said seal means comprising a flexible sealing ring adapted to abut one of the respective opposite sides when the gate is closed;

(m) a back-up ring axially outwardly of each sealing ring;

(n) spring means axially outwardly of each back-up ring to bias said back-up rings into abutment with said sealing rings and said sealing rings into abutment with said respective opposite sides to form said seal;

(o) means on said back-up rings to urge said sealing rings radially outwardly in said annular recesses when said last rings are biased into abutment with said gate, (p) said sealing rings being in abutment with said surfaces of said opposite sides around said semicircular recess when said valve is open; and (q) means to pressure balance said shaft in said body.

3. A gate valve comprising:

(a) an elongated body;

(b) a flow passage extending transversely through said body adjacent one end thereof, (c) said flow passage having an inlet and an outlet;

(d) an elongated gate having substantially parallel opposite flat sides and being slidably engaged to move longitudinally in a path in said body;

(e) a portion of said opposite flat sides adjacent one end of said gate being adapted to be moved from an open position into a closing position across said passage between said inlet and said outlet to shut off the flow therethrough;

(f) a semicircular recess extending inwardly in said one end of said gate and having its center line in a direction perpendicular to said opposite sides, (g) said semicircular recess being in alignment with said flow passage when said gate is open;

(h) surfaces of said opposite sides extending around said semicircular recess;

(i) a rotatable shaft extending into said body;

(j) a lever connected to said shaft and to said gate to move said gate to its open and closed positions when said shaft is rotated;

(k) seal means in respective annular recesses in said inlet and outlet on each side of said gate forming a seal on the gate at the flow passage when the gate is closed;

(l) each of said seal means comprising a flexible sealing ring adapted to abut one of the respective opposite sides when the gate is closed;

(m) a back-up ring axially outwardly of each sealing ring;

(n) spring means axially outwardly of each back-up ring to bias said back-up rings into abutment with said sealing rings, and said sealing rings into abutment with said respective opposite sides to form said seal;

(o) means on said back-up rings to urge said sealing rings radially outwardly in said annular recesses when said last rings are biased into abutment with said gate, (p) said sealing rings being in abutment with said surfaces of said opposite sides around said semicircular recess when said valve is open; and (q) means to permit access to said seal means in said body to remove and replace them when said gate is open and when said gate is closed.

4. A gate valve comprising:

(a) an elongated body;

(b) a flow passage extending transversely through said body adjacent one end thereof, (c) said flow passage having an inlet and an outlet;

(d) an elongated gate having substantially parallel opposite flat sides and being slidably engaged to move longitudinally in a path in said body;

(e) a portion of said opposite flat sides adjacent one end of said gate being adapted to be moved from an open position into a closing position across said passage between said inlet and said outlet to shut off the flow therethrough;

(f) a semicircular recess extending inwardly in said one end of said gate and having its center line in a direction perpendicular to said opposite sides, (g) said semicircular recess being in alignment with said flow passage when said gate is open;

(h) surfaces of said opposite sides extending around said semicircular recess;

(i) a rotatable shaft extending into said body;

(j) a lever connected to said shaft and to said gate to move said gate to its open and closed positions when said shaft is rotated;

(k) seal means in respective annular recesses in said inlet and outlet on each side of said gate forming a seal on the gate at the flow passage when the gate is closed;
(l) each of said seal means comprising a flexible sealing ring adapted to abut one of the respective opposite sides when the gate is closed;
(m) a back-up ring axially outwardly of each sealing ring;
(n) spring means axially outwardly of each back-up ring to bias said back-up rings into abutment with said sealing rings and said sealing rings into abutment with said respective opposite sides to form said seal; and
(o) means on said back-up rings to urge said sealing rings radially outwardly in said annular recesses when said last rings are biased into abutment with said gate,
(p) said sealing rings being in abutment with said surfaces of said opposite sides around said semicircular recess when said valve is open,
(q) said body surrounding said flow passage and said seal means being integral.

5. A gate valve comprising:
(a) an elongated body;
(b) a flow passage extending transversely through said body adjacent one end thereof,
(c) said flow passage having an inlet and an outlet;
(d) an elongated gate having substantially parallel opposite flat sides and being slidably engaged to move longitudinally in a path in said body;
(e) a portion of said opposite flat sides adjacent one end of said gate being adapted to be moved from an open position into a closing position across said passage between said inlet and said outlet to shut off the flow therethrough;
(f) a semicircular recess extending inwardly in said one end of said gate and having its center line in a direction perpendicular to said opposite sides,
(g) said semicircular recess being in alignment with said flow passage when said gate is open;
(h) surfaces of said opposite sides extending around said semicircular recess;
(i) a rotatable shaft extending into said body;
(j) a lever connected to said shaft and to said gate to move said gate to its open and closed positions when said shaft is rotated;
(k) seal means in respective annular recesses in said inlet and outlet on each side of said gate forming a seal on the gate at the flow passage when the gate is closed;
(l) each of said seal means comprising a flexible sealing ring adapted to abut one of the respective opposite sides when the gate is closed;
(m) a back-up ring axially outwardly of each sealing ring;
(n) spring means axially outwardly of each back-up ring to bias said back-up rings into abutment with said sealing rings and said sealing rings into abutment with said respective opposite sides to form said seal;
(o) means on said back-up rings to urge said sealing rings radially outwardly in said annular recesses when said last rings are biased into abutment with said gate,
(p) said sealing rings being in abutment with said surfaces of said opposite sides around said semicircular recess when said valve is open; and
(q) means in said seal means to relieve excessive pressure within said body when said gate is closed.

6. A gate valve comprising:
(a) an elongated body;
(b) a flow passage extending transversely through said body adjacent one end thereof;
(c) said flow passage having an inlet and an outlet;
(d) an elongated gate having substantially parallel opposite flat sides and being slidably engaged to move longitudinally in a path in said body;
(e) a portion of said opposite flat side adjacent one end of said gate being adapted to be moved from an open position into a closing position across said passage between said inlet and outlet to shut off the flow therethrough;
(f) a semicircular recess extending inwardly in said one end of said gate;
(g) said semicircular recess being in alignment with said flow passage when said gate is open;
(h) surfaces of said opposite sides extending around said semicircular recess;
(i) means on said body to move said gate between said open and closed positions;
(j) seal means in respective annular recesses in said inlet and outlet on each side of said gate forming a seal on the gate at the flow passage when the gate is closed;
(k) each of said seal means comprising a flexible sealing ring adapted to abut one of the respective opposite sides when the gate is closed;
(l) a back-up ring axially outwardly of each sealing ring;
(m) spring means axially outwardly of each back-up ring to bias said back-up rings into abutment with said sealing rings and said sealing rings into abutment with said respective opposite sides to form said seal; and
(n) means on said back-up rings to urge said sealing rings radially outwardly in said annular recesses when said last rings are biased into abutment with said gate;
(o) said sealing rings being in abutment with said surfaces of said opposite sides around said semicircular recess when said valve is open.

7. A gate valve comprising:
(a) an elongated body;
(b) a flow passage extending transversely through said body adjacent one end thereof,
(c) said flow passage having an inlet and an outlet;
(d) an elongated gate having substantially parallel opposite flat sides and being slidably engaged to move longitudinally in a path in said body;
(e) a portion of said opposite flat sides adjacent one end of said gate being adapted to be moved from an open position into a closing position across said passage between said inlet and outlet to shut off the flow therethrough;
(f) a semicircular recess extending inwardly in said one end of said gate, and having its center line in a direction perpendicnular to said opposite sides,
(g) said semicircular recess being in alignment with said flow passage when said gate is open;
(h) surfaces of said opposite sides extending around said semicircular recess;
(i) means on said body to move said gate between said open and closed positions; and
(j) seal means in respective annular recesses in said inlet and outlet on each side of said gate forming a seal on the gate at the flow passage when the gate is closed;
(k) each of said seal means being biased axially to have sealing surfaces thereof to abut one of the respective opposite sides when the gate is closed,
(l) said seal means being in abutment with said surfaces of said opposite sides around said semicircular recess when the valve is open.

8. The invention according to claim 7, in which said means to move said gate comprises:
(a) a rotatable shaft extending into and supported adjacent opposite ends thereof in said body;
(b) a lever connected to said shaft and to said gate to move said gate to its open and closed positions when said shaft is rotated;
(c) a first O-ring in a groove in said shaft adjacent one end thereof to form a seal between said body and said shaft; and (d) a second O-ring surrounding said shaft adjacent an opposite end thereof and supported in said body to form a seal between said body and said shaft, (e) said first O-ring having an outside diameter equal to the inside diameter of said second O-ring whereby the sealed areas of said shaft adjacent said ends are equal and said shaft is pressure balanced.

9. The invention according to claim 7, having:
means to permit access to said seal means within said body to remove and replace them when said gate is open and when said gate is closed.

10. The invention according to claim 7, having:
means to balance said gate within said body when it is open.

11. The invention according to claim 7, including:
(a) said seal means having outer surfaces radially outwardly of said sealing surfaces exposed to pressure within said body when said gate is closed,
(b) said pressure on said outer surfaces tending to move said seal means axially away from said gate whereby when said last pressure within said body is excessive it will be relieved by the movement of the sealing surfaces away from said gate.

12. A gate valve comprising:
(a) an elongated body;
(b) a flow passage extending transversely through said body adjacent one end thereof,
(c) said flow passage having an inlet and an outlet;
(d) an elongated gate having substantially parallel opposite flat sides and being slidably engaged to move longitudinally in a path in said body;
(e) a portion of said opposite flat sides adjacent one end of said gate being adapted to be moved from an open position into a closing position across said passage between said inlet and outlet to shut off the flow therethrough;
(f) a semicircular recess extending inwardly in said one end of said gate and having its center line in a direction perpendicular to said opposite sides,
(g) said semicircular recess being in alignment with said flow passage when said gate is open;
(h) surfaces of said opposite sides extending around said semicircular recess;
(i) means on said body to move said gate between said open and closed positions;
(j) annular seal means in respective annular recesses in said inlet and outlet on each side of said gate forming a seal on the gate at the flow passage when the gate is closed;
(k) each of said seal means being biased to have sealing surfaces thereof abutting one of the respective opposite sides when the gate is closed; and
(l) means on said seal means to urge annular surfaces thereof into sealing contact radially outwardly in said annular recesses when said last rings are biased into abutment with said gate,
(m) said sealing rings being in abutment with said surfaces of said opposite sides around said semicircular recess when the valve is open.

References Cited by the Examiner

UNITED STATES PATENTS

| | | | |
|---|---|---|---|
| 1,753,276 | 4/1930 | Quinn | 251—328 X |
| 2,423,393 | 7/1947 | Louck | 251—261 |
| 2,533,931 | 12/1950 | Hartley | 251—174 |
| 2,718,372 | 9/1955 | Broz | 251—174 |
| 2,732,170 | 1/1956 | Shand | 251—172 |
| 2,796,230 | 6/1957 | Grove | 251—172 |
| 2,834,613 | 5/1958 | Snyder | 251—174 X |
| 2,866,253 | 12/1958 | Wynn | 251—204 X |
| 2,962,039 | 11/1960 | Shand | 251—174 X |
| 2,985,421 | 5/1961 | Anderson | 251—172 |
| 2,985,422 | 5/1961 | Anderson | 251—328 X |
| 3,105,620 | 10/1963 | Atkins | 251—328 X |

WILLIAM F. O'DEA, *Primary Examiner.*

CLARENCE R. GORDON, *Examiner.*